United States Patent [19]

Pechacek

[11] 4,403,387
[45] Sep. 13, 1983

[54] METHOD OF MAKING FRAME FOR THE CONSTRUCTION OF HEMISPHERICAL MULTI-LAYERED SHELL

[75] Inventor: Raymond E. Pechacek, Houston, Tex.

[73] Assignee: Hahn & Clay, Houston, Tex.

[21] Appl. No.: 262,422

[22] Filed: May 11, 1981

[51] Int. Cl.³ ............................................. B23P 17/00
[52] U.S. Cl. ....................................... 29/416; 29/281.1; 29/463; 29/526 R; 29/559; 228/44.1 R; 228/184; 269/289 R
[58] Field of Search .................. 29/416, 526 R, 281.1, 29/463, 446, 559; 228/184, 4.1, 44.1 R; 269/37, 289 R; 220/3

[56] References Cited

U.S. PATENT DOCUMENTS

| | | | |
|---|---|---|---|
| 2,235,290 | 3/1941 | Excline | 29/416 X |
| 3,374,528 | 3/1968 | Bowcutt et al. | 29/281.1 X |
| 3,374,935 | 3/1968 | Pechacek | 228/44 |
| 3,389,670 | 6/1968 | Caple | 29/416 X |
| 3,423,820 | 1/1969 | Pechacek et al. | 29/447 |
| 3,568,289 | 3/1971 | Jenkins, Sr. et al. | 228/44.1 X |
| 3,604,587 | 9/1971 | Pechacek | 220/3 |
| 3,750,353 | 8/1973 | Smith, Jr. | 29/416 X |
| 3,774,296 | 11/1973 | Clay | 29/471.3 |
| 3,785,040 | 1/1974 | Pechacek | 29/447 |
| 3,963,233 | 6/1976 | Worden | 269/289 R |
| 4,078,293 | 3/1978 | Aine | 29/416 |
| 4,101,065 | 7/1978 | Novikov et al. | 228/184 X |
| 4,235,361 | 11/1980 | Hays et al. | 228/184 X |
| 4,260,047 | 8/1981 | Nels | 29/416 X |
| 4,295,262 | 10/1981 | Grate et al. | 29/281.1 X |

FOREIGN PATENT DOCUMENTS

| | | | |
|---|---|---|---|
| 52-44545 | 11/1977 | Japan | 228/184 |
| 88295 | 2/1921 | Switzerland | 29/416 |

OTHER PUBLICATIONS

Hahn & Clay Brochure Serial No. 36 entitled "Complete-Layered High-Pressure Vessels", Hahn & Clay in accord with ASME Code Section VIII, Div. 1 & 2.

*Primary Examiner*—Charlie T. Moon
*Attorney, Agent, or Firm*—Pravel, Gambrell, Hewitt, Kirk & Kimball

[57] ABSTRACT

A plurality of annular plates are machined to have substantially identical outer diameters equal to the inner diameter of the head to be made. A first annular plate is arranged as an annular base plate. The other annular plates are cut into four congruent arc portions of less than 90° and braces are attached to each congruent arc portion. A plurality of the arc portions are mounted by a first end to the upper surface of the annular base plate in a substantially equally, circumferentially spaced arrangement. The second end of each arc portion is fastened to the outer surface of a central collar to form the hemispherical frame.

5 Claims, 4 Drawing Figures

METHOD OF MAKING FRAME FOR THE CONSTRUCTION OF HEMISPHERICAL MULTI-LAYERED SHELL

TECHNICAL FIELD

This invention relates to the construction of multi-layered pressure vessels. This invention specifically relates to frames for constructing a multi-layered vessel having a hemispherical head or a multi-layer spherical vessel.

BACKGROUND OF THE INVENTION

Pressure vessels are used for a large number of industrial applications. Pressure vessel walls may be constructed of a single layer or of multiple layers. Often a pressure vessel will contain one or more hemispherical heads because of the structural strength of a hemispherical shape. Such multi-layer pressure vessels are disclosed in U.S. Pat. Nos. 3,774,296; 3,785,040; 3,604,587 and 3,423,820. In single wall vessels, a hemispherical shape may be cast or milled as a single unit. In multi-layer shells, hemispherical heads are sometimes formed around a hemispherical inner layer by welding on successive layers of gores onto the inner layer in the fashion disclosed in U.S. Pat. Nos. 3,374,935 and 3,423,820. Typically, the main support during the manufacture of the hemispherical head is a hemispherical frame. Such frames have been formed by cutting arc segments from plate metal and welding a hemispherical frame from such arcs onto a base plate. Because of the imprecise nature of cutting, the hemispherical frame formed is not perfect and the construction of the head is made more difficult by the need to correct for such deficiencies during construction.

In addition, the depth of each arc segment required to provide the necessary strength for the frame produces a heavy frame which is difficult to dismantle. If, as is sometimes necessary, the frame must remain in place until the whole vessel is built, the frame must be cut by torch into small enough pieces to be withdrawn through an access hatch.

Because pressure vessels are often one-of-a-kind constructions, more expensive techniques of forming more perfect hemispherical frames by casting or machining are not economical. Therefore, with the prior art, the vessel manufacturer was faced with the choice of manufacturing a more precise and expensive frame or the more economical but less accurate frame for making the head.

SUMMARY OF THE INVENTION

A plurality of annular plates are machined to have substantially identical outer diameters equal to the inner diameter of the head to be made. A first annular plate is arranged as an annular base plate. The other annular plates are cut into four congruent arc portions of less than 90° and braces are attached to each congruent arc portion. A plurality of the arc portions are mounted by a first end to the upper surface of the annular base plate in a substantially equally, circumferentially spaced arrangement. The second end of each arc portion is fastened to the outer surface of a central collar to form the hemispherical frame.

DESCRIPTION OF THE PREFERRED EMBODIMENT

Figure 4:
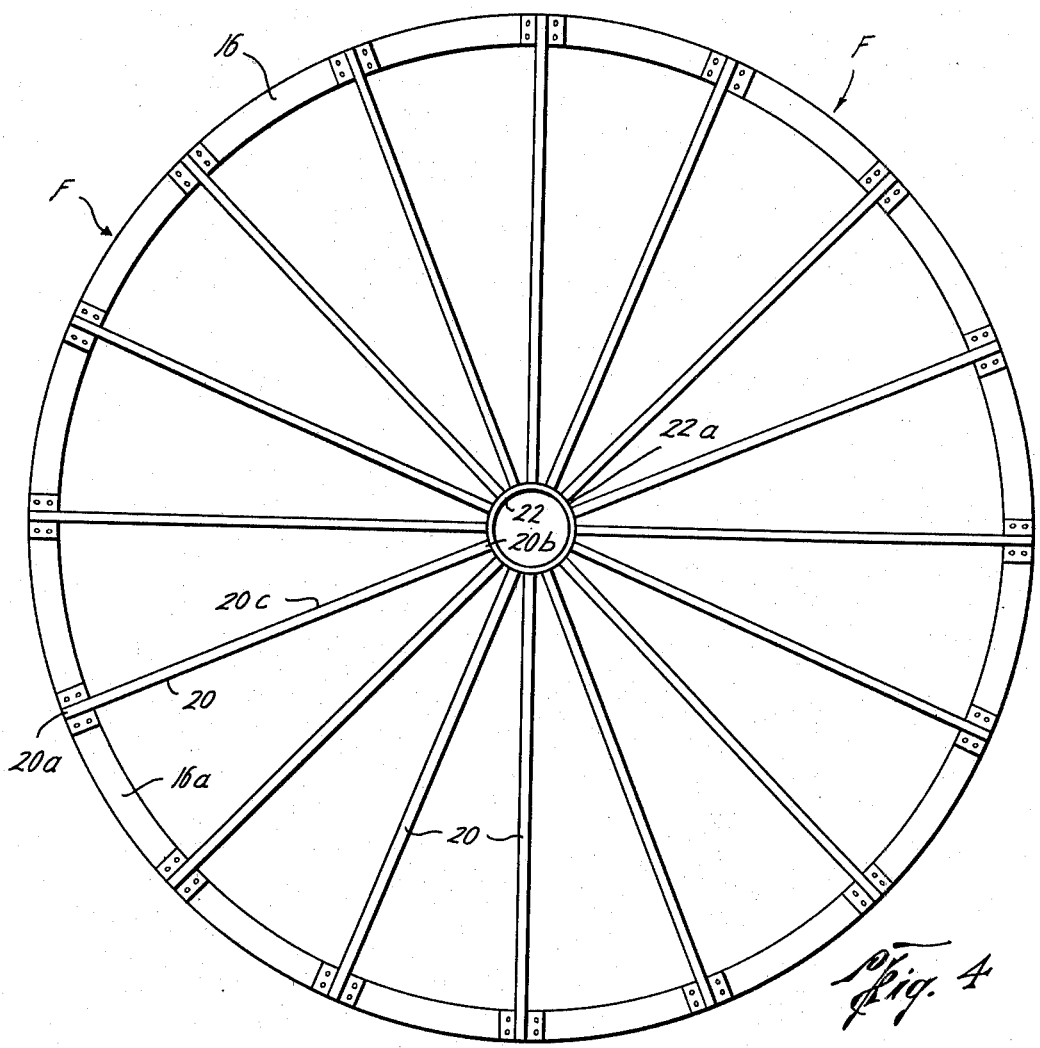
FIG. 4 is a top view of the completed frame.
Figure 3:
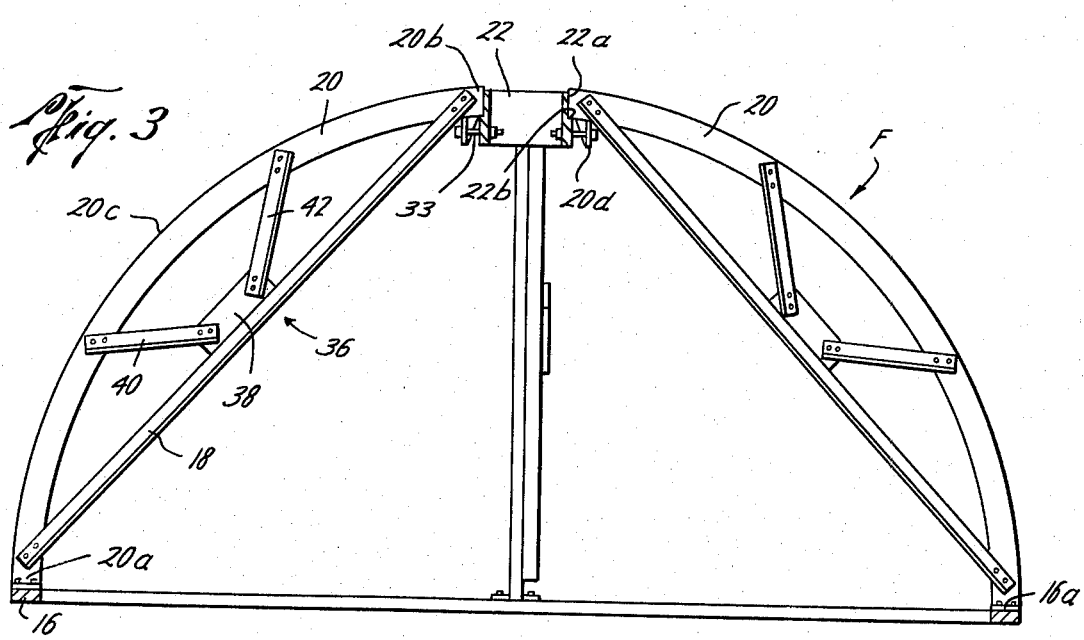
FIG. 3 is a side view partly in cross-section of the completed frame.

Referring to the drawings and in particular FIGS. 3 and 4, the letter F generally designates the completely assembled frame for the manufacture of a multi-layer head for a cylindrical multi-layer vessel. It should be understood that the frame F and the method of manufacture of the frame F cannot only be used for manufacture of a multi-layered hemispherical head, but also for the manufacture of a spherical head or other curved or dome-shaped vessel sections. Hereinafter, this disclosure will discuss the fabrication of a hemispherical head only but it should be understood that the principles discussed herein are applicable to such other structures.

Figure 1:
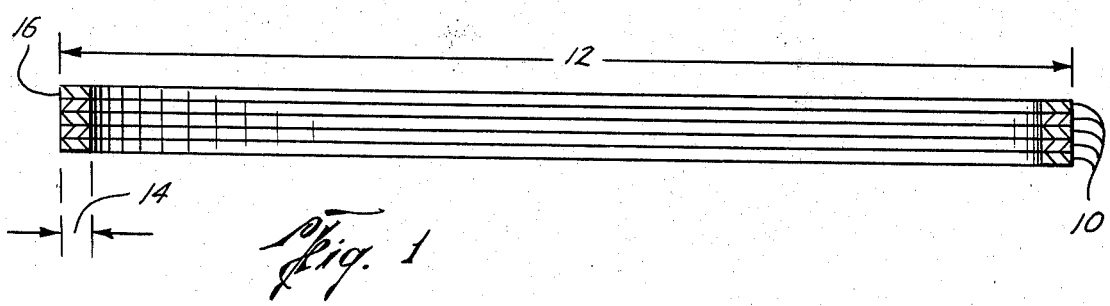
FIG. 1 is a cross-sectional view of stacked annular plates after milling.
Figure 2:
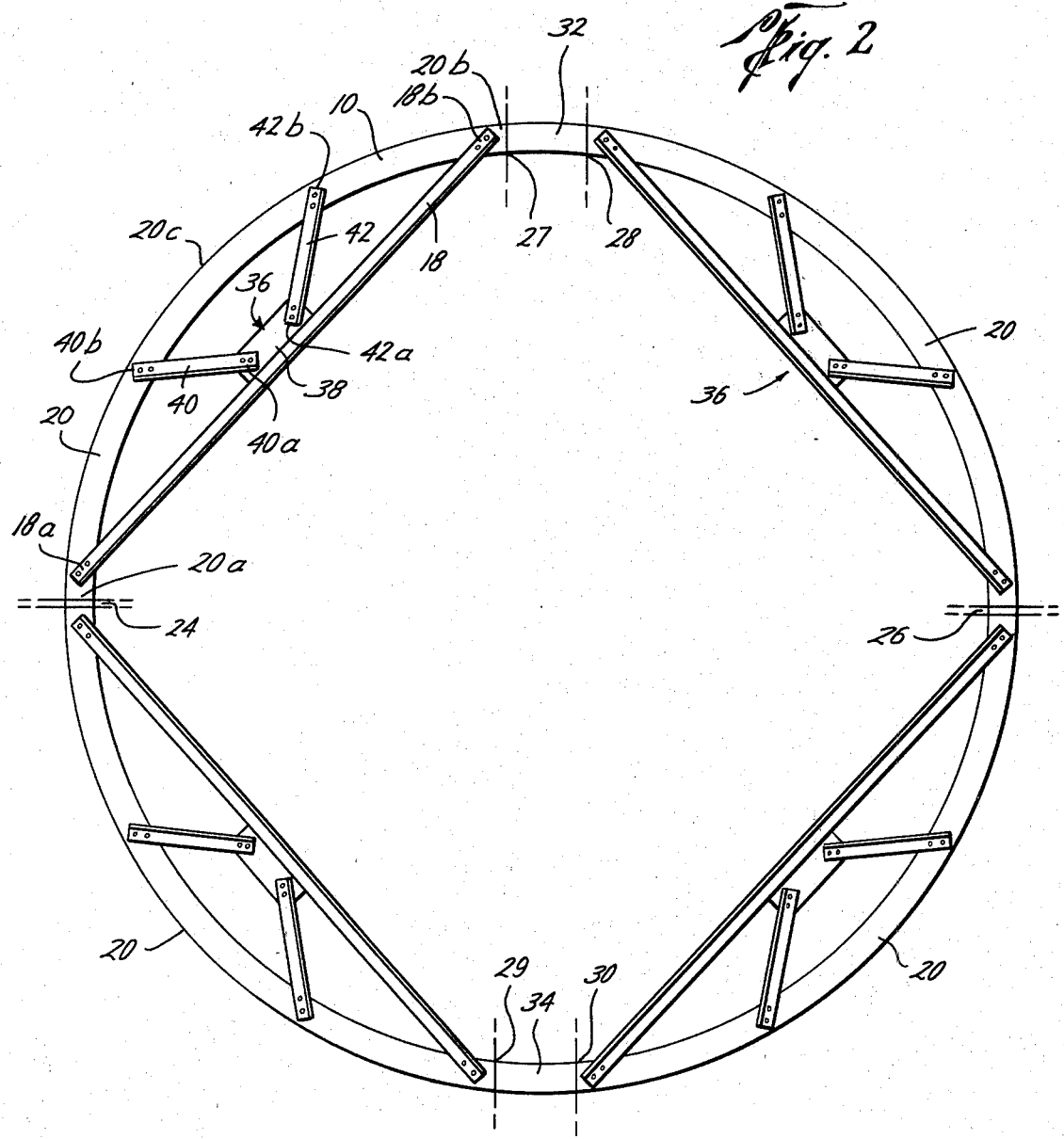
FIG. 2 is a top view of an annular plate, with braces mounted, prepared for cutting into four arc portions.

FIG. 1 shows a plurality of annular plates 10 which are machined to have a substantially equal outer diameter 12. The outer diameter 12 of the annular plates 10 is equal to the desired inner diameter of hemispherical head to be constructed. The width 14 of the annular plates 10 is chosen to provide sufficient strength. Because of the bracing, discussed below, the width 14 may be considerably less than would be necessary without bracing. A base plate 16 is taken from the plurality of annular plates 10 and arranged as the base for the frame F of the present invention.

Each remaining annular plate 10 is cut into four substantially congruent arc portions 20 of less than 90°. A brace member 18 such as an angle iron is attached to each of the arc portions 20. As best seen in FIGS. 3 and 4, a plurality of the arc portions 20 are mounted to the upper surface 16a of base plate 16 by a first end 20a. The arc portions 20 are circumferentially spaced equally around the annular base plate 16 and directed radially inward. Each arc portion second end 20b is fastened to the outer surface 22a of a central annular collar 22.

The preferred method of mounting the brace members 18 to the arc portions 20, as well as the arc portions 20 to the base plate 16 and collar 22 is bolting. This allows easy disconnection of the brace members 18 and arc portions 20 when it is desired to remove the arc portions 20 from the completed head. Although the annular plates 10 may be individually machined, it is most economical and accurate to stack the plate metal to be machined and simultaneously machine the plurality of annular plates 10. The brace members 18 may be added to the arc portions 20 before or after the arc portions 20 are cut from the annular plates 10.

Bracing means, generally designated as 36, include the brace member 18 with first end 18a and second end 18b. The brace member first end 18a is mounted adjacent the arc portion first end 20a and the bracing member second 18b is mounted adjacent the arc portion second 20b. A brace plate 38 is mounted to the brace member 18 substantially equal distance from the first end 18a and the second end 18b of the brace member 18. From the brace plate 38 short bracing members or trusses 40 and 42 are mounted. The short bracing members first ends 40a and 42a are attached to the brace plate 38. The short bracing means second ends 40b and 42b are mounted along the arc portion 20 such that the distances between brace member first end 18a and short brace member second end 40b, short brace member second end 40b and short brace member second end 42b, and short brace member second end 42b and brace member second end 18b will be substantially equal. In the embodiment illustrated, the short brace members or trusses 40 and 42 are bolted to plate 38 and to the arc portion 20.

Because the desired frame F should have a diameter equal to the outer diameter of the annular plates 10, each annular plate 10 will be first cut at points 24 and 26 which are diametrically opposite. Four more cuts 27, 28, 29 and 30 will be made to form four arc portions 20. The cuts are made so that the surface at the first end 20a of each arc portion will be perpendicular to the surface at the second end 20b. The second removed 32 between cuts 27 and 28 and the section 34 between cuts 29 and 30 will have a length substantially equal to the outer diameter of the collar 22. Therefore, when the arc portions 20 are mounted by the first ends 20a to base plate 16 upper surface 16a and the second ends 20b are mounted to the collar 22 (as shown in FIGS. 3 and 4), a hemispherical surface is formed of the outer curved edges 20c of each aligned arc portion 20.

The central collar 22 is a generally cylindrical member or ring of an outer diameter substantially equal to that of the length of the removed segments 32 and 34. The outer surface 22a of the central collar 22 has a ridge or shoulder 22b which receives and supports the ends 20b of each arc portion 20 in alignment. Each arc portion end 20b has a stud 20d welded on the underside to receive a bolt 33 which also extends through the collar 22. The arc portions 20 are mounted circumferentially, equally spaced along the base plate 16 and, therefore, are also mounted circumferentially, equally spaced about the collar 22. If the vessel to be constructed is to have an opening in the hemispherical head, the opening may be formed about the collar 22.

The number of arc portions 20 to be mounted on the base plate 16 will depend upon the radius of the head to be built and the size of the gores to be used. In a typical example, five annular plates or rings 10 will initially be machined, with one being the base plate 16 and the other four being cut into sixteen arc portions 20 as shown in FIG. 4.

Once assembled, the frame F is placed within a partially constructed vessel, in a shop or elsewhere where it is necessary to fabricate the hemispherical head. Such fabrication is accomplished by the addition of gores directly onto the arc portions to form a first layer. Though, as is known from prior patents such as those already discussed, the vessel head is completed one layer at a time, one of the advantages of the frame F is that it may be finally assembled in the field and easily disassembled and removed, even from inside a completed multi-layer vessel.

The foregoing disclosure and description of the invention are illustrative and explanatory thereof and various changes in the size, shape and materials as well as the details of the illustrated construction may be made without departing from the spirit of the invention. For example, a frame for a spherical vessel may be made by joining two hemispherical frames F together.

I claim:

1. A method for making a hemispherical frame for constructing a hemispherical multi-layered head, comprising the steps of:
    machining a plurality of annular plates to a substantially equal outer diameter, which outer diameter is substantially equal to the inner diameter of the hemispherical frame to be manufactured thereon;
    arranging one of the annular plates in position as a base plate;
    cutting the remainder of the plates into substantially congruent arc portions of less than 90°, each of the arc portions having first and second end;
    mounting a brace member to each of the arc portions;
    mounting the arc portions by the first end to the upper surface of the annular base plate;
    circumferentially spacing the arc portions in a radial direction, equally around the annular base plate; and
    fastening the second end of each of the arc portions to a central annular collar.

2. The method of claim 1, wherein said step of mounting the brace member includes the step of:
    bolting the brace member to the arc portion.

3. The method of claim 2, further comprising the steps of:
    disconnecting the brace members, the arc portions and the base plate; and
    removing the brace members, the arc portions and the base plate from the completed head.

4. The method of claim 1, wherein:
    said machining of said plates includes stacking the annular plates; and
    simultaneously machining the stacked annular plates.

5. The method of claim 1, wherein:
    said cutting step comprises cutting the surface at the first end of the arc portion perpendicular to the surface at the second end of the arc portion.

* * * * *

UNITED STATES PATENT AND TRADEMARK OFFICE
CERTIFICATE OF CORRECTION

PATENT NO. : 4,403,387
DATED : September 13, 1983
INVENTOR(S) : Raymond E. Pechacek It is certified that error appears in the above-identified patent and that said Letters Patent are hereby corrected as shown below:

In Column 3; line 18, please delete the word "second" and insert therefore --section--.

In Column 4; line 26, please delete the word "end" and insert therefore --ends--.

Signed and Sealed this

Thirteenth Day of December 1983

[SEAL]

Attest:

GERALD J. MOSSINGHOFF

Attesting Officer

Commissioner of Patents and Trademarks